US008513569B2

(12) United States Patent
Hsu et al.

(10) Patent No.: US 8,513,569 B2
(45) Date of Patent: Aug. 20, 2013

(54) ARC ENERGY REGULATION IN DRAWN ARC FASTENER WELDING PROCESS

(75) Inventors: Christopher Hsu, Avon, OH (US); Jeffrey J. Krupp, Vermilion, OH (US)

(73) Assignee: Nelson Stud Welding, Inc., Elyria, OH (US)

( * ) Notice: Subject to any disclaimer, the term of this patent is extended or adjusted under 35 U.S.C. 154(b) by 154 days.

(21) Appl. No.: 12/830,764

(22) Filed: Jul. 6, 2010

(65) Prior Publication Data

US 2012/0006801 A1    Jan. 12, 2012

(51) Int. Cl.
B23K 9/10    (2006.01)

(52) U.S. Cl.
USPC ...... 219/130.31; 219/98; 219/99; 219/137 PS

(58) Field of Classification Search
USPC .............. 219/98, 99, 130.21, 130.31, 130.32, 219/130.33, 137 PS
See application file for complete search history.

(56) References Cited

U.S. PATENT DOCUMENTS

| 3,575,573 | A | * | 4/1971 | McCollister et al. ...... 219/130.1 |
| 5,393,164 | A | * | 2/1995 | Renner et al. ................. 403/271 |
| 5,662,820 | A | | 9/1997 | Schwiete et al. |
| 5,688,413 | A | * | 11/1997 | Kondo ............................ 219/98 |
| 5,938,945 | A | * | 8/1999 | Hofmann et al. ............... 219/99 |
| 5,977,506 | A | | 11/1999 | von Daniken |
| 6,713,708 | B2 | | 3/2004 | Hedberg |
| 2002/0153357 | A1 | | 10/2002 | Kurz et al. |
| 2003/0164357 | A1 | | 9/2003 | Hedberg |
| 2004/0169017 | A1 | | 9/2004 | Sakoda |

FOREIGN PATENT DOCUMENTS

| DE | 102007039306 A1 | 2/2009 |
| EP | 0117925 A1 | 9/1984 |
| GB | 2103136 A | 2/1983 |
| WO | 2010033565 A2 | 3/2010 |

OTHER PUBLICATIONS

Partial European Search Report dated Oct. 21, 2011; 3 pgs.
European Search Report dated Feb. 3, 2012; 10 pgs.

* cited by examiner

*Primary Examiner* — Pho M Luu
*Assistant Examiner* — Thao Bui
(74) *Attorney, Agent, or Firm* — Clark Hill PLC

(57) ABSTRACT

A drawn arc welding process that includes the steps of providing a work piece, providing a welding tool holding a metal object onto the work piece, providing a power supply outputting a preset current, providing an arc voltage sensing device, lifting the metal object and drawing a pilot arc current, energizing a welding current locally melting the metal object and forming a weld pool in the work piece, measuring an arc voltage, predicting the arc voltage for a remaining time of the welding process, regulating the time of the welding process wherein the measured arc voltage and predicted arc voltage are utilized to control a desired energy input set point, and plunging the fastener into the locally melted work piece forming a weld between the metal object and the work piece.

21 Claims, 19 Drawing Sheets

Supporting Data:
WELD ID=A
Reference Weld – Same settings and weld conditions as target:

Weld ID=B
Difference from reference weld A: Increase gun lift
Constant energy function = off

Weld ID=C
Difference from reference weld A: Increase gun lift
Constant energy function = on

Weld ID=D
Difference from reference weld A: Decrease gun lift
Constant energy function = off

Weld ID=E
Difference from reference weld A: Decrease gun lift
Constant energy function = on

Weld ID=F
Difference from reference weld A: Cutting oil added to surface
Constant energy function = off

Weld ID=G
Difference from reference weld A: Cutting oil added to surface
Constant energy function = on

Weld ID=H
Reference weld (short cycle). Same as target settings.

Weld ID=I
Difference from reference weld H: Cutting oil added to surface
Constant energy function = off

Weld ID=J
Difference from reference weld H: Cutting oil added to surface
Constant energy function = on

Weld ID=K
Difference from reference weld H: Increased lift.
Constant energy function = off

Weld ID=L
Difference from reference weld H: Increased lift.
Constant energy function = on

Weld ID=M
Difference from reference weld H: Decreased lift.
Constant energy function = off

Weld ID=N
Difference from reference weld H: Decreased lift.
Constant energy function = on

Weld ID=O
Difference from reference weld H: Galvanized base material.
Constant energy function = off

Weld ID=P
Difference from reference weld H: Galvanized base material.
Constant energy function = on

US 8,513,569 B2

ARC ENERGY REGULATION IN DRAWN ARC FASTENER WELDING PROCESS

FIELD OF THE INVENTION

The invention relates to a process for drawn arc welding of fasteners to a work piece.

BACKGROUND OF THE INVENTION

Generally, drawn arc fastener welding is performed using a constant current welding process with a fixed arc current and a fixed arc time as welding parameters that are maintained by a drawn arc stud welding power source. Other process variables include a lift height and plunge depth that are typically controlled by various mechanisms including mechanical mechanisms as well as electronically controlled devices. The lift height and weld puddle depression create an arc gap between the fastener and work piece, and the length of the arc gap and the ionization potential gradient of the arc plasma together with fixed anode and cathode drops establish an arc voltage. The product of the arc voltage and arc current is an arc power which may be multiplied by an arc time to compute an arc energy. The amount of arc energy serves as the heat source that melts both the fastener and the work piece. The resultant heat generated by the arc energy may have an effect on the process stability and weld quality performed in a welding operation.

As stated above, conventional drawn arc welding processes use a fixed arc current, arc time, lift height, and plunge depth in production regardless of various parameters associated with the work piece and process conditions. For example, the lift height may vary as a result of differences in the set-up of welding tools (for example hand guns) within a fabrication shop or manufacturing facility. Additionally, various work pieces may contain coatings such as zinc or other contamination such as a layer of oil or other material such as a rust or mill scale, or weldable primer paint. As a result, the heat input to both the fastener and work piece may vary and may result in inconsistency and lack of repeatability in weld quality, weld appearance or backside marking. There is therefore a need in the art for a drawn arc welding process that delivers a constant arc energy for a particular welding application.

SUMMARY OF THE INVENTION

In one aspect, there is disclosed a drawn arc welding process that includes the steps of providing a work piece, providing a welding tool holding a metal object onto the work piece, providing a power supply outputting a pilot arc current, providing an arc voltage sensing device, lifting the metal object apart from the work piece and drawing an arc at pilot arc current, energizing a preset welding current locally melting the metal object and forming a weld pool in the work piece, measuring an arc voltage, accumulating arc energy, predicting the arc voltage for a remaining time of the welding process, regulating the time of the welding process wherein the accumulated arc energy and predicted arc voltage are utilized to achieve a desired total energy input set point, and plunging the fastener into the locally melted work piece forming a weld between the metal object and the work piece.

In another aspect, there is disclosed a drawn arc welding process that includes the steps of providing a work piece, providing a welding tool holding a metal object onto the work piece, providing a power supply outputting a preset current, providing an arc voltage sensing device, lifting the metal object apart from the work piece and drawing an arc at pilot arc current, energizing a preset welding current locally melting the metal object and forming a weld pool in the work piece measuring an arc in multiple measurement phases including a first phase having an initial melting of a surface or surface coating of the work piece wherein the measured arc voltage is discarded and additional phases wherein the arc voltage is measured and stored, predicting the arc voltage for a remaining time of the welding process, accumulating arc energy, regulating the time of the welding process wherein the accumulated arc energy and predicted arc voltage are utilized to achieve a desired energy input set point, and plunging the fastener into the locally melted work piece forming a weld between the metal object and the work piece, In a further aspect, there is disclosed a drawn arc welding process that includes the steps of providing a work piece, providing a welding tool holding a metal object onto the work piece, providing a power supply outputting a preset current, providing an arc voltage sensing device, lifting the metal object apart from the work piece and drawing an arc at pilot arc current, energizing a preset welding current locally melting the metal object and forming a weld pool in the work piece, measuring an arc in multiple measurement phases including a first phase having an initial melting of a surface or surface coating of the work piece wherein the measured arc voltage is discarded and additional phases wherein the arc voltage is measured and stored and wherein the measuring step includes measuring the voltage at output terminals of the welder and subtracting a cable and connector voltage drop estimated from a previous weld during stud plunge, predicting the arc voltage for a remaining time of the welding process, accumulating arc energy, regulating the time of the welding process wherein the accumulated arc energy and predicted arc voltage are utilized to achieve a desired energy input set point, and plunging the fastener into the locally melted work piece forming a weld between the metal object and the work piece.

DETAILED DESCRIPTION OF THE PREFERRED EMBODIMENTS

Figure 1:
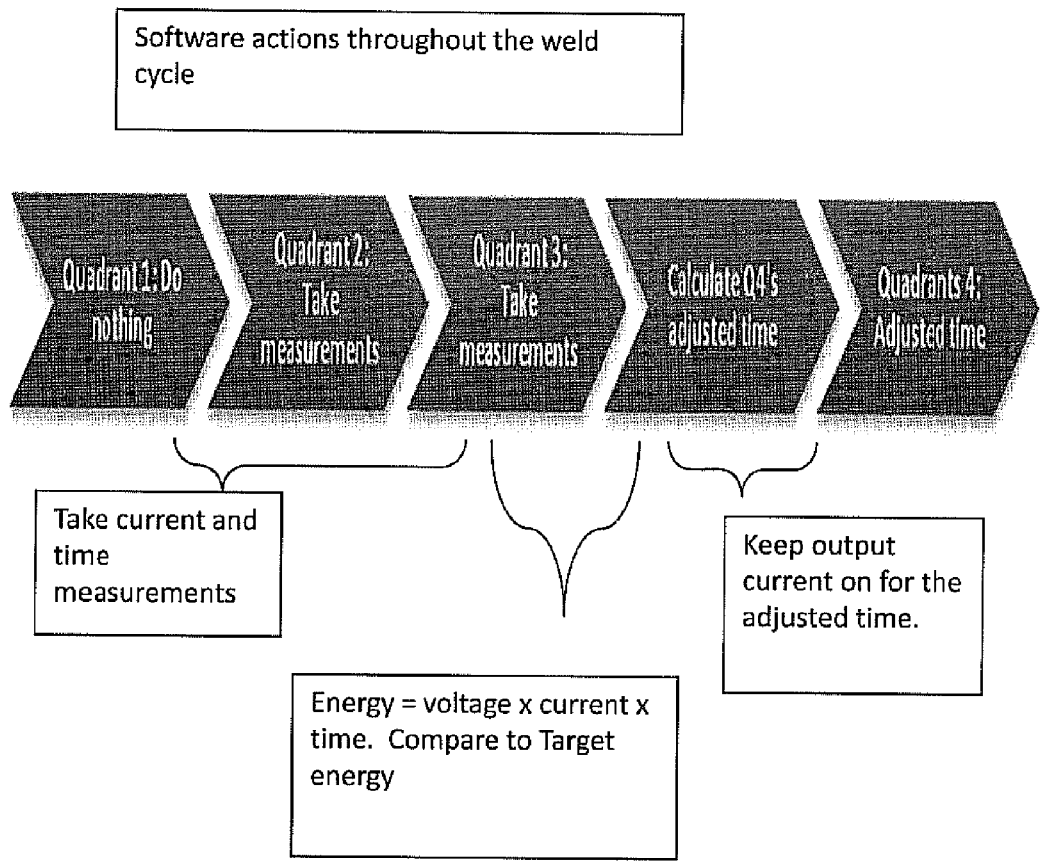
FIG. 1 is a block diagram of a constant energy welding process feedback control logic.
Figure 2:
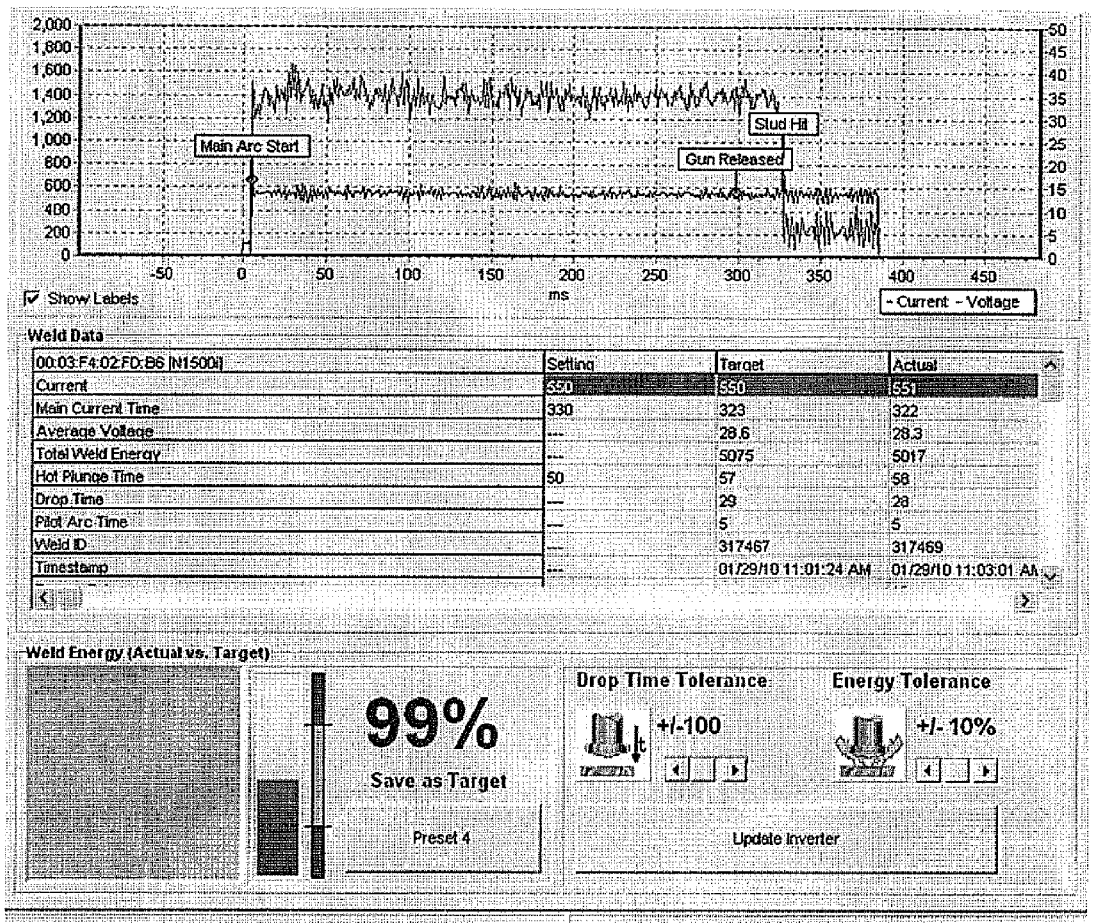
FIG. 2 is a graph of the arc voltage and arc current as a function of time for a reference weld.
Figure 3:
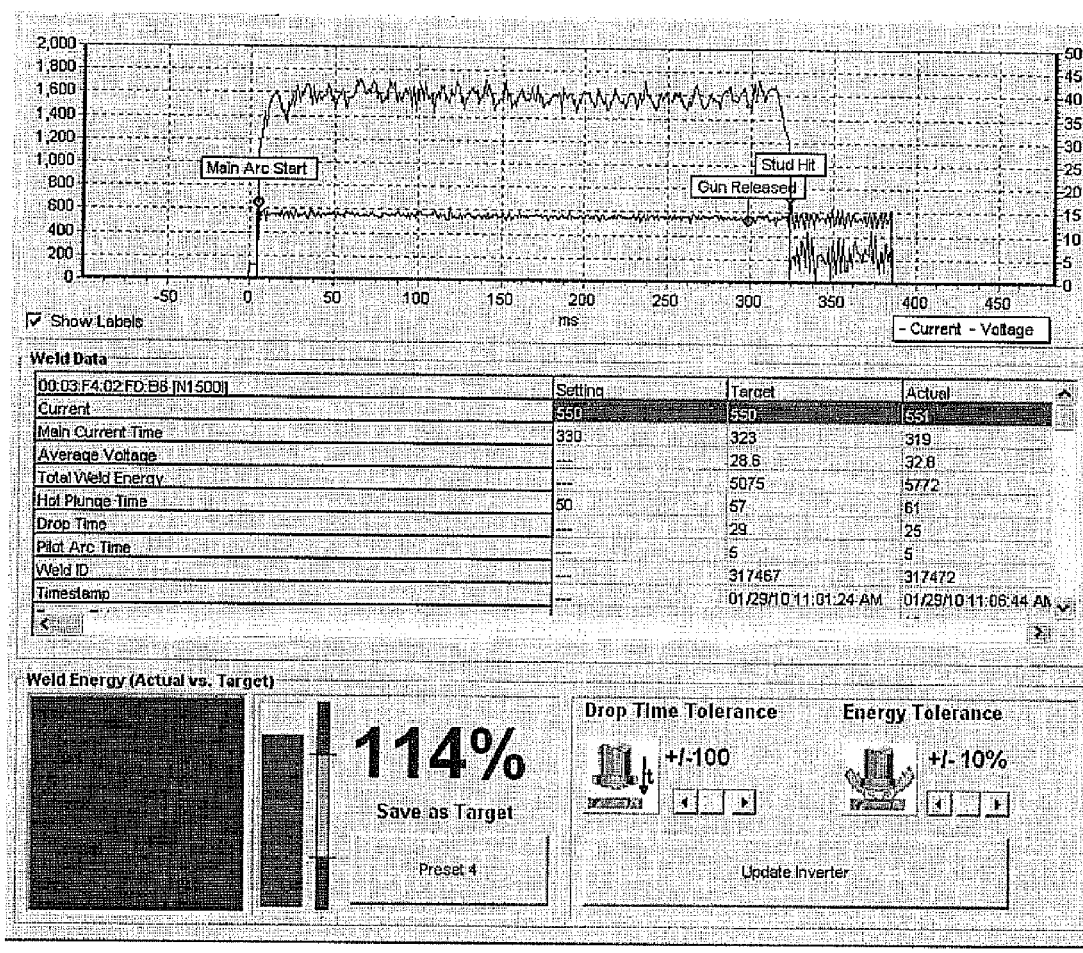
FIG. 3 is a graph of the arc current and arc voltage including an increased gun lift in comparison to the reference of FIG. 2 that does not utilize a constant energy input control.
Figure 4:
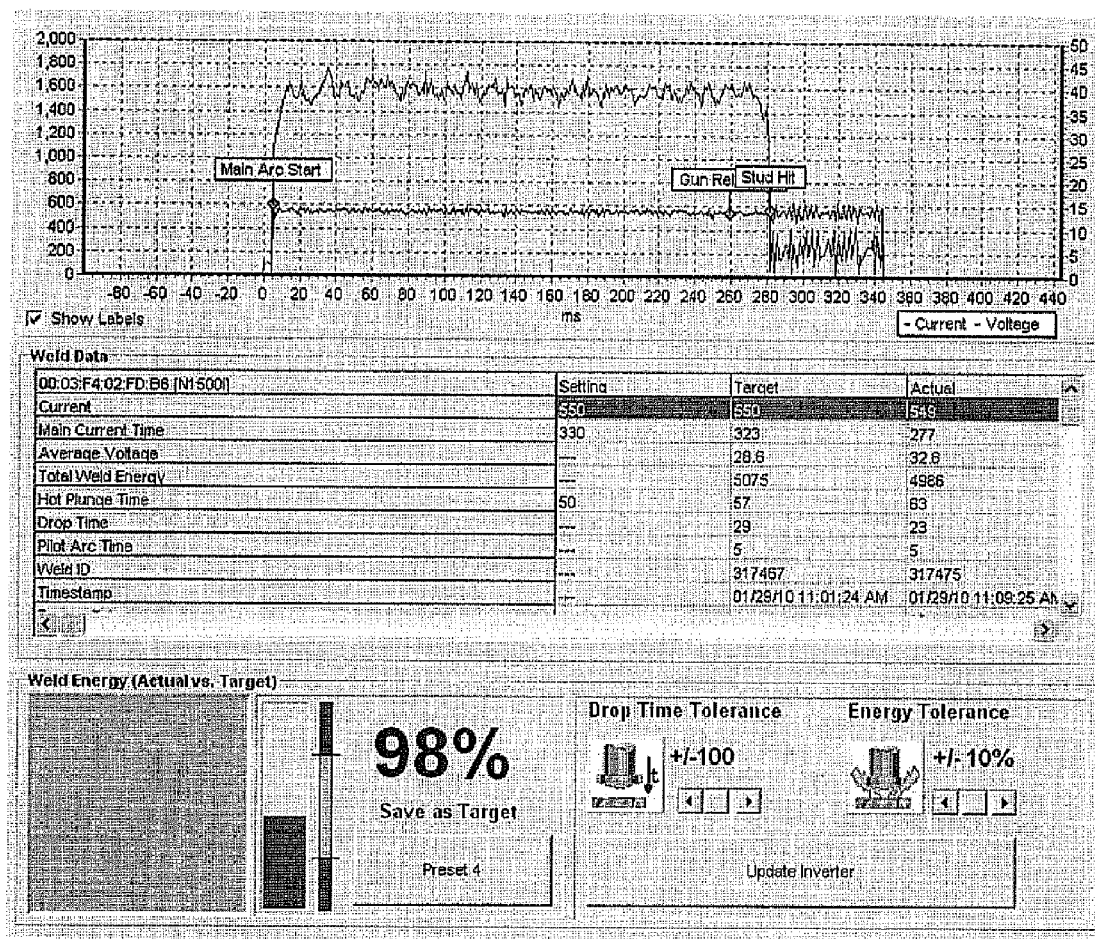
FIG. 4 is a graph of the arc current and arc voltage as a function of time including the increased gun lift of FIG. 3 and including a constant energy input control.
Figure 5:
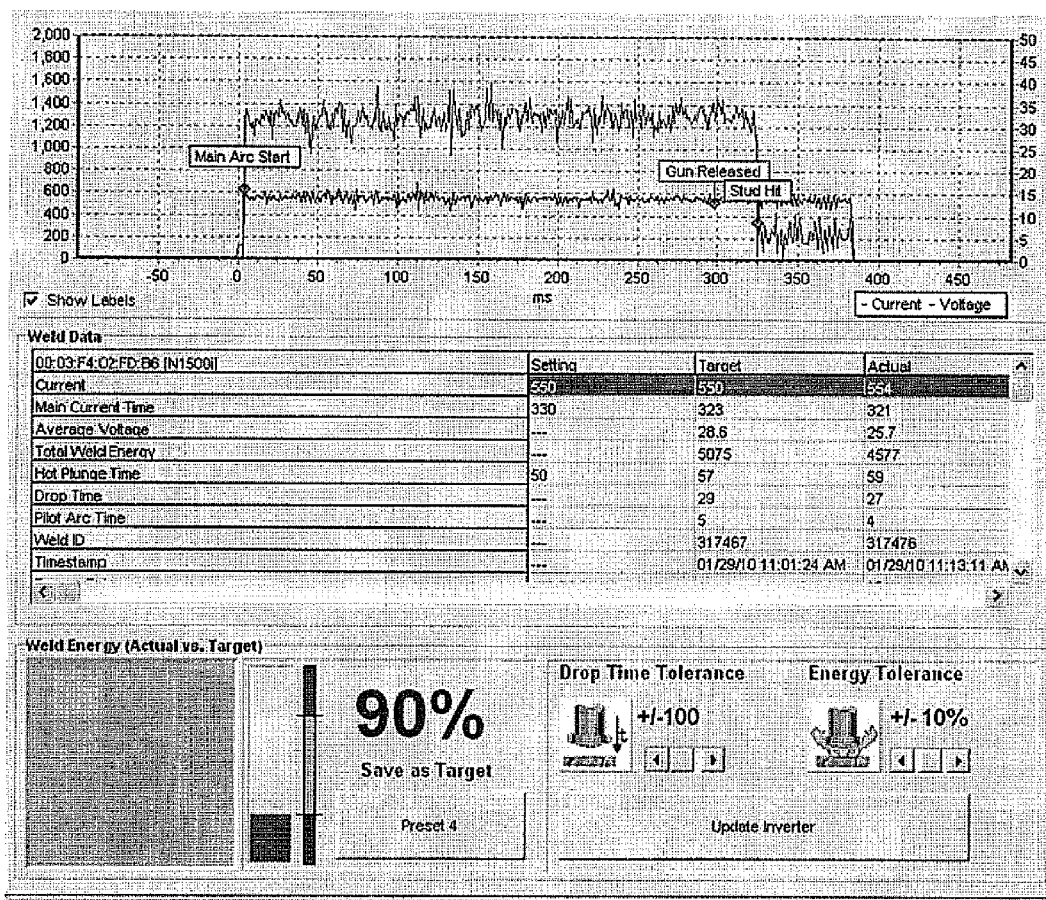
FIG. 5 is a graph of the arc current and arc voltage as a function of time including a decreased gun lift in comparison to the reference of FIG. 2 without a constant energy input control.
Figure 6:
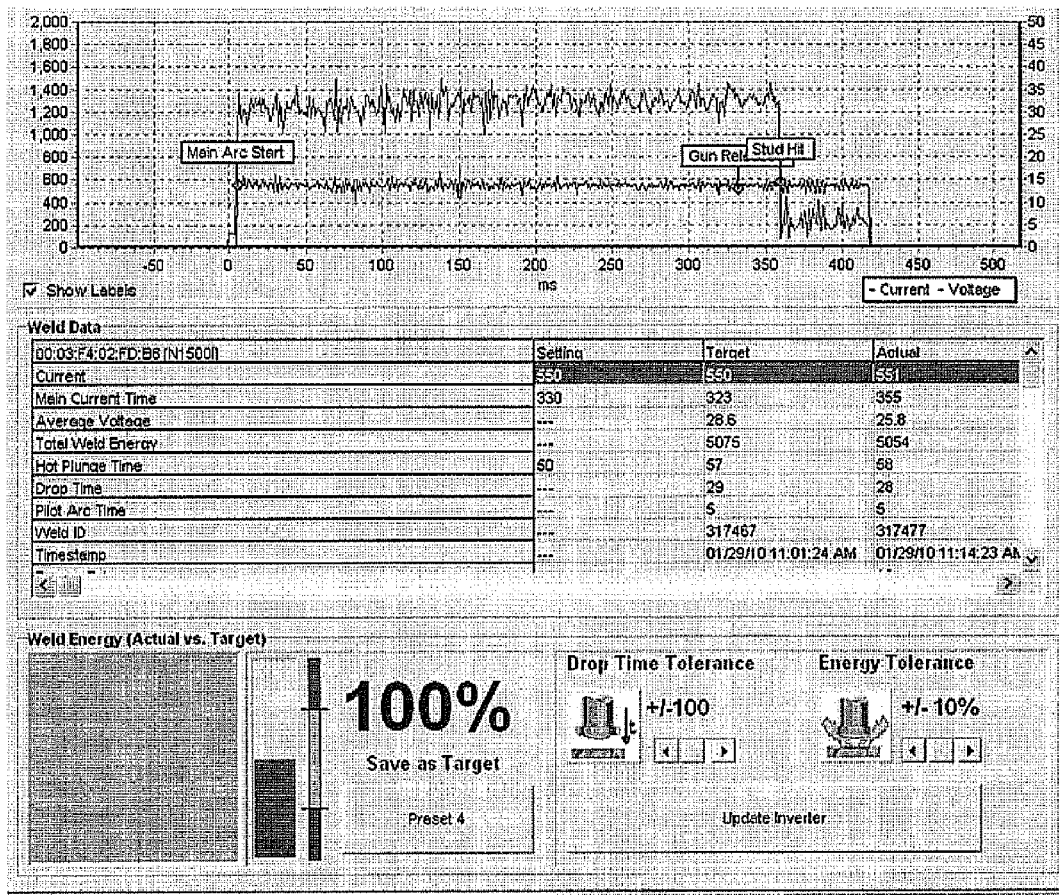
FIG. 6 is a graph of the arc current and arc voltage including a decreased gun lift of FIG. 5 and including a constant energy input control.
Figure 7:
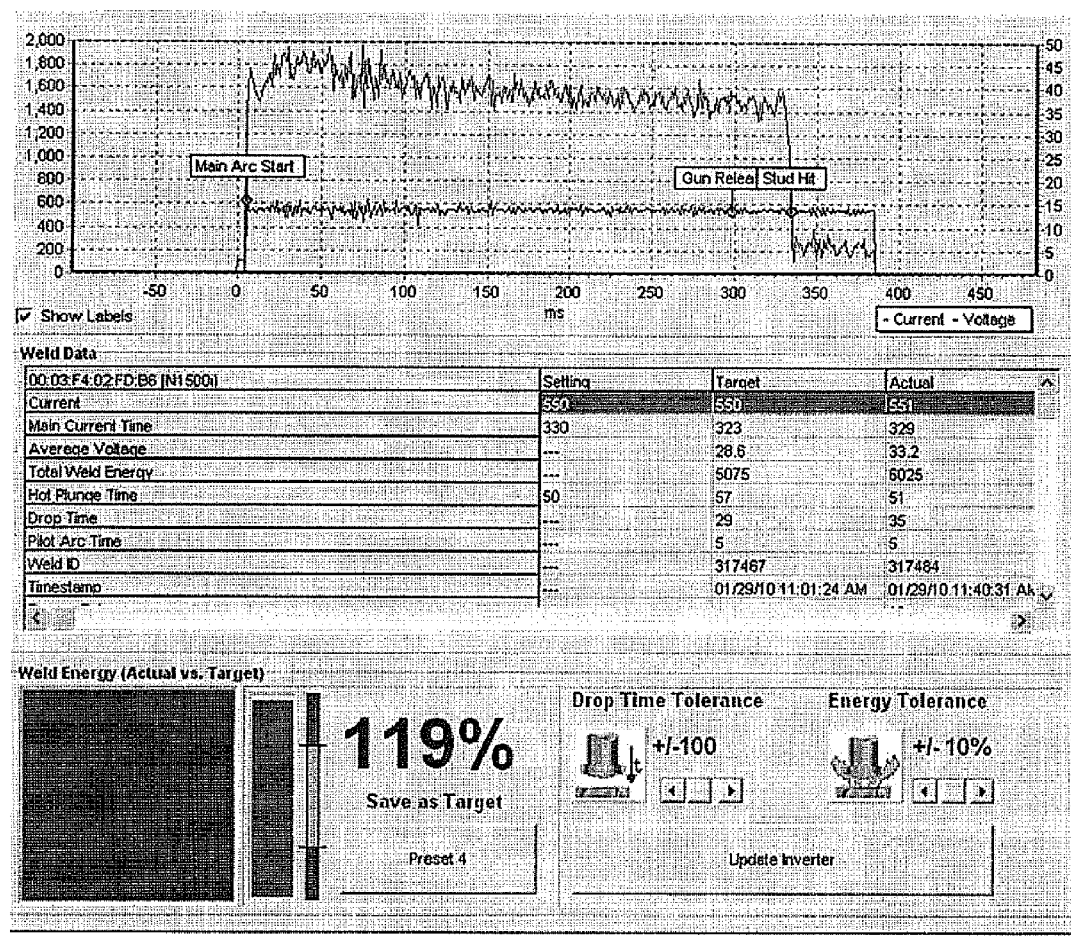
FIG. 7 is a graph of the arc current and arc voltage as a function of time that includes cutting oil added to a surface of a work piece in comparison to the reference of FIG. 2 with a constant energy input control not included.
Figure 8:
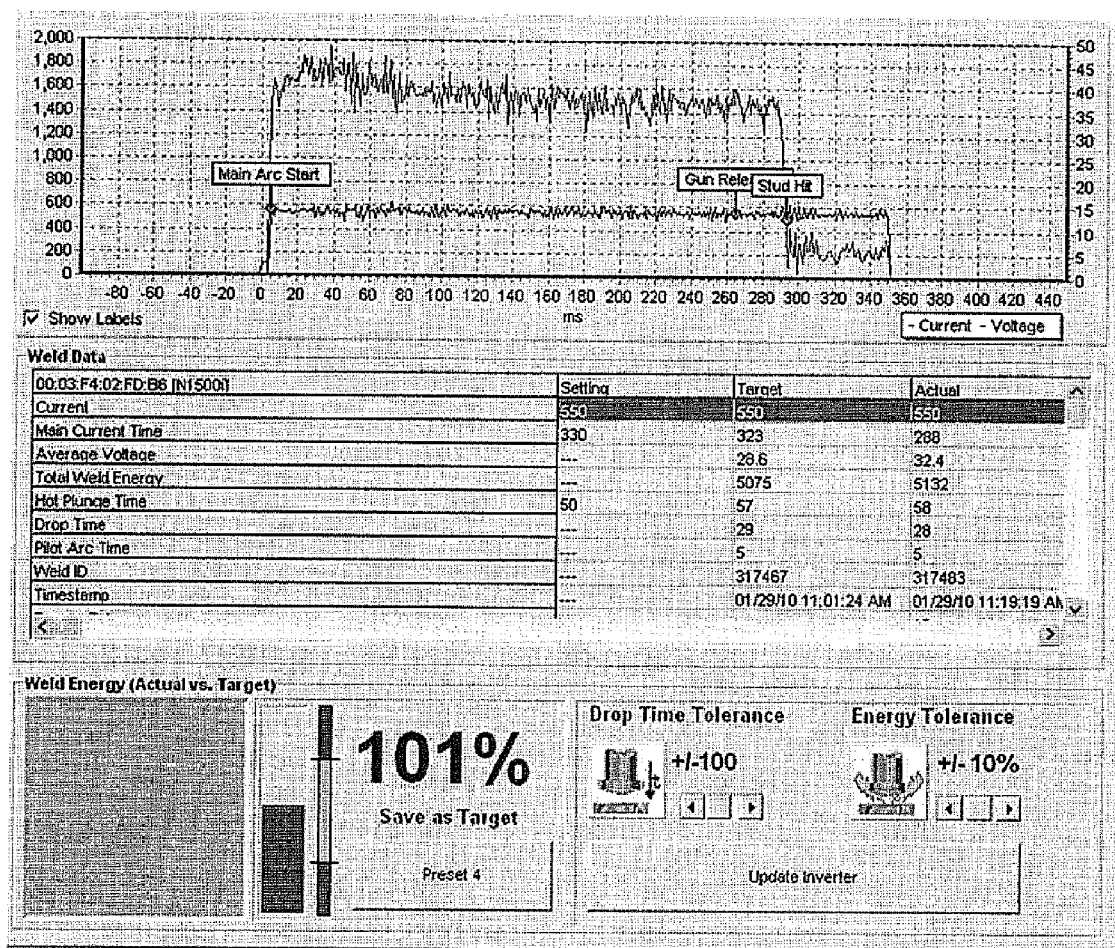
FIG. 8 is a graph of the arc current and arc voltage as a function of time in comparison to the reference including cutting oil as in FIG. 7 and including a constant energy input control.
Figure 9:
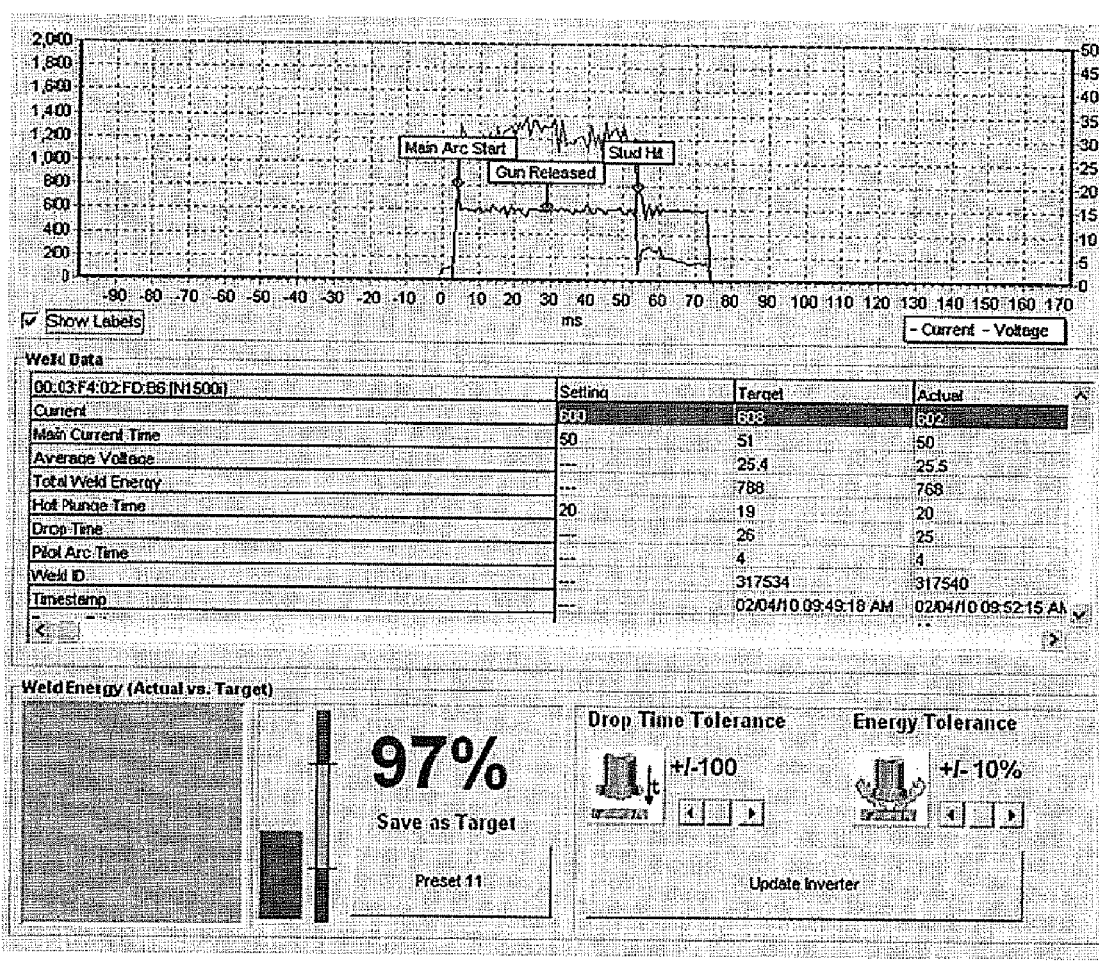
FIG. 9 is a graph of an arc voltage and arc current as a function of time for a short cycle welding process and is a reference weld.
Figure 10:
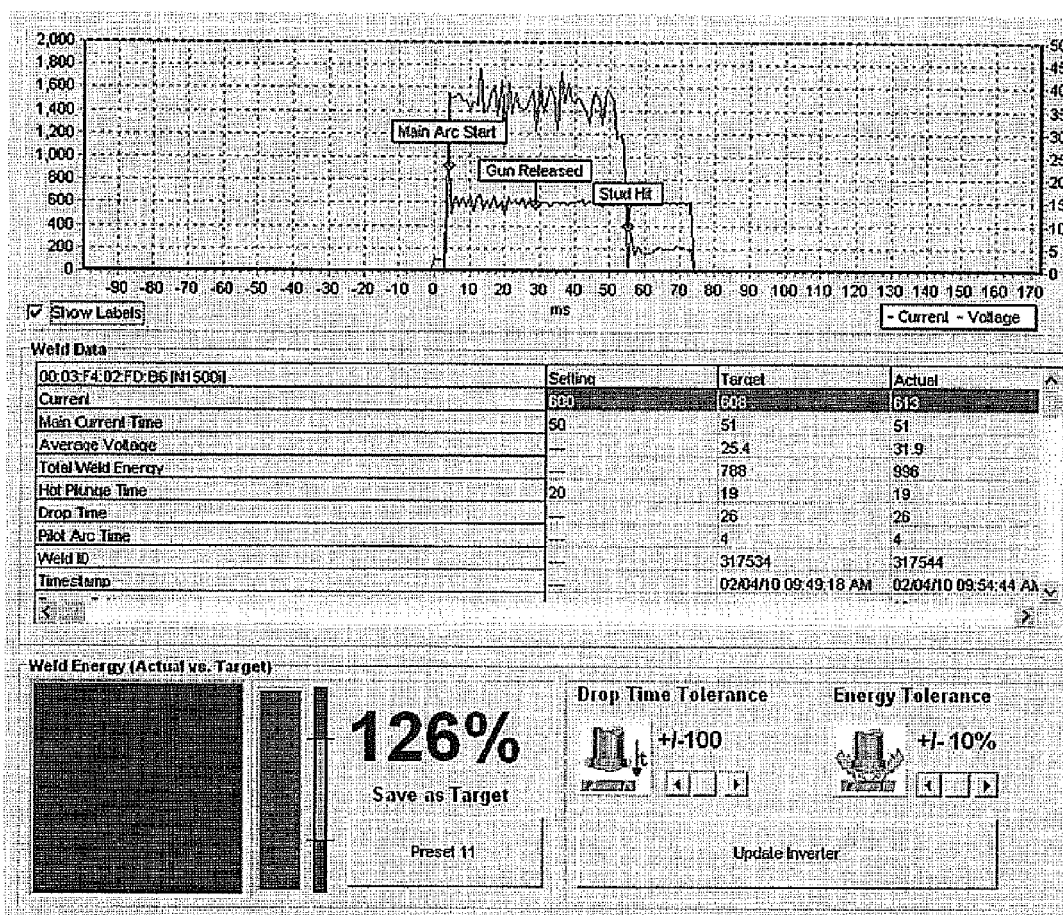
FIG. 10 is a graph of the arc voltage and arc current as a function of time differing from the reference of FIG. 9 and including cutting oil added to a surface of a work piece with a constant energy input control not included.
Figure 11:
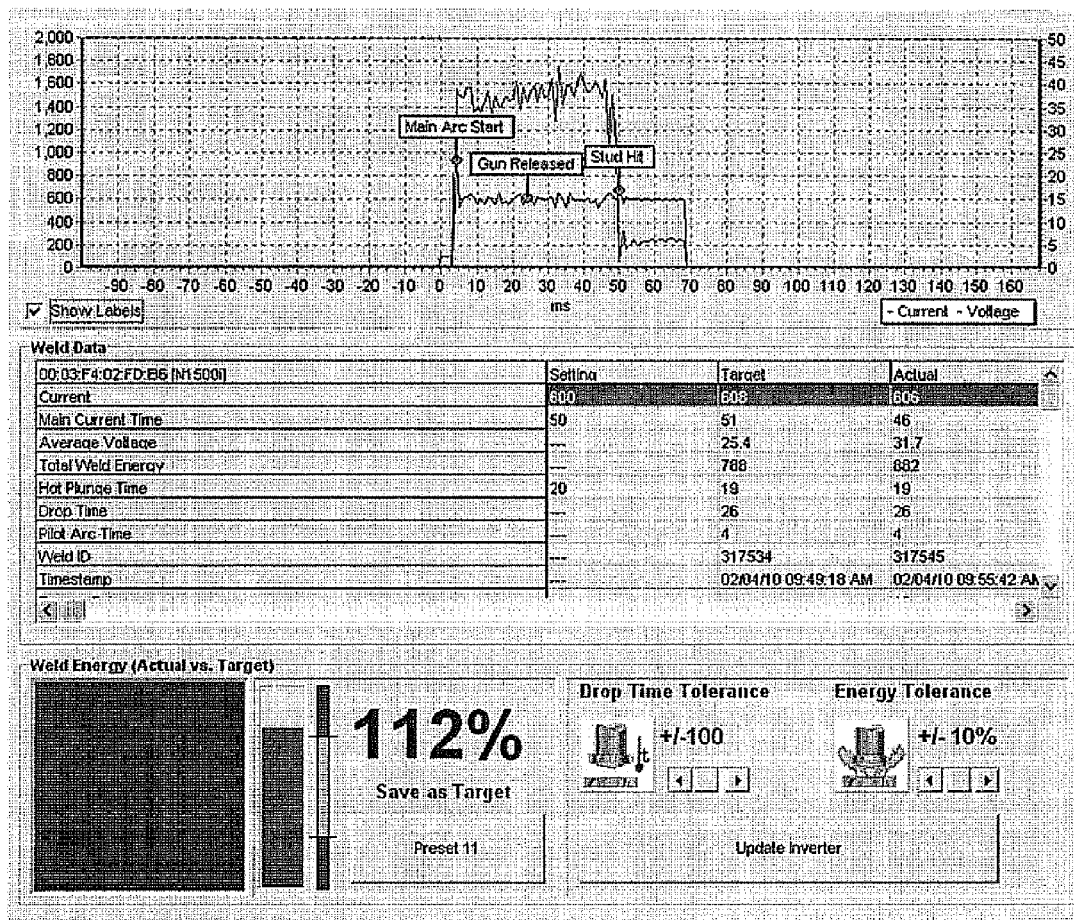
FIG. 11 is a graph of the arc current and arc voltage as a function of time differing from the reference of FIG. 9 and including cutting oil added to a surface of the work piece with a constant energy input control.
Figure 12:
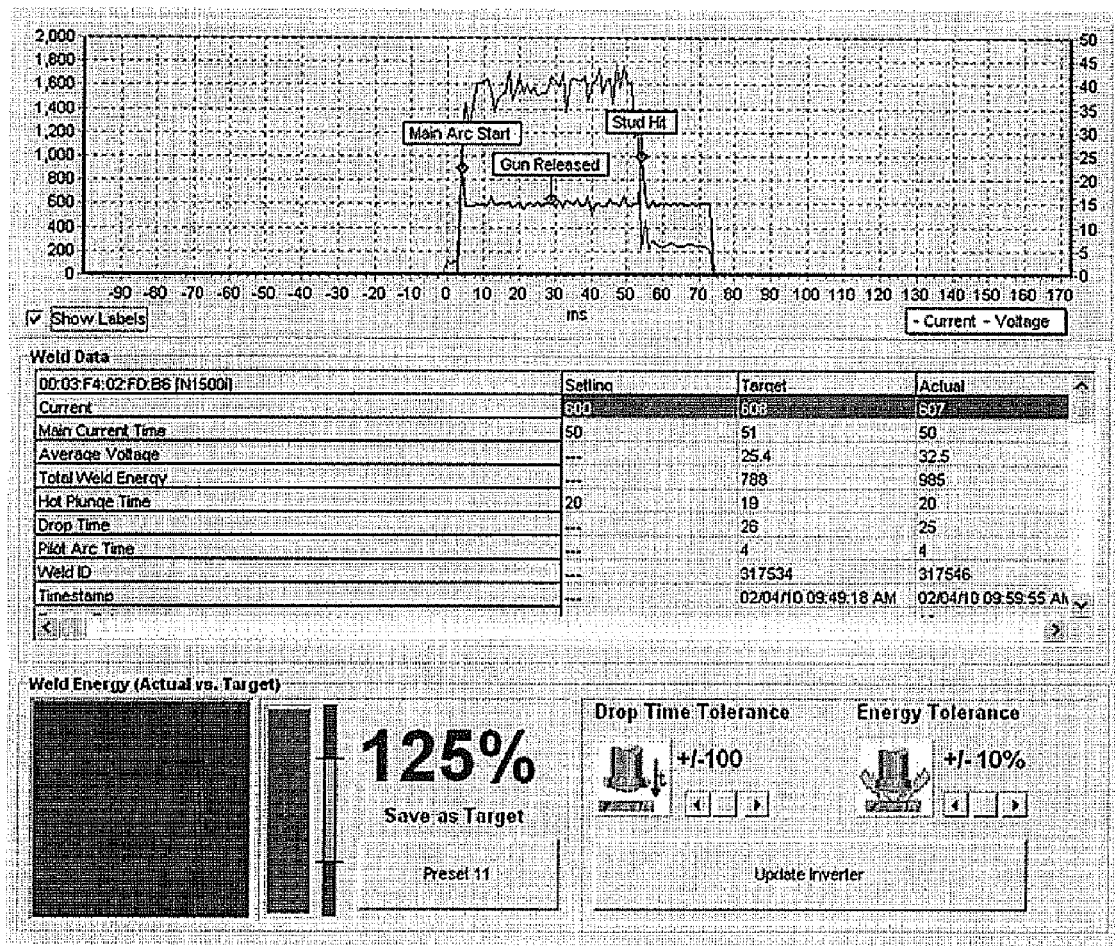
FIG. 12 is a graph of the arc current and arc voltage as a function of time differing from the reference of FIG. 9 and including an increased lift with a constant energy input control not included.
Figure 13:
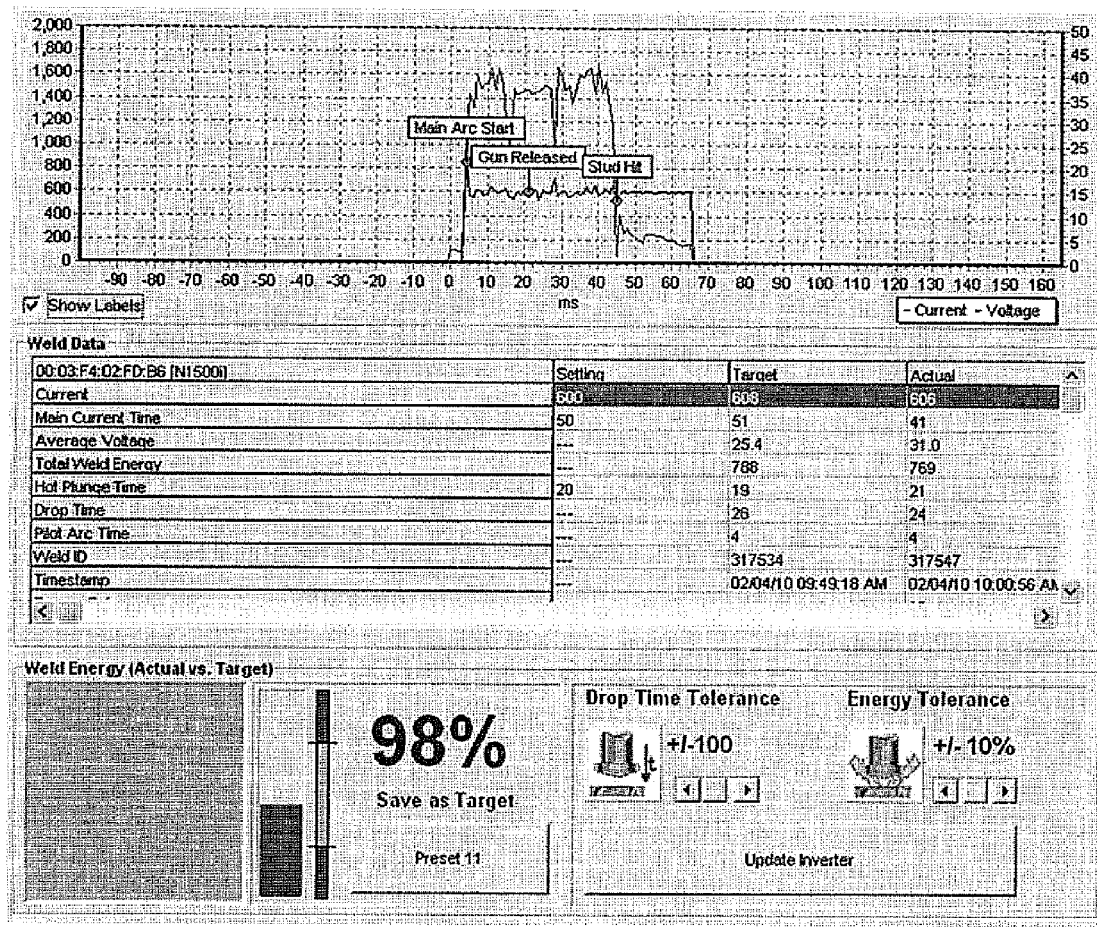
FIG. 13 is a graph of the arc current and arc voltage as a function of time differing from the reference of FIG. 9 including an increased lift and including a constant energy input control.
Figure 14:
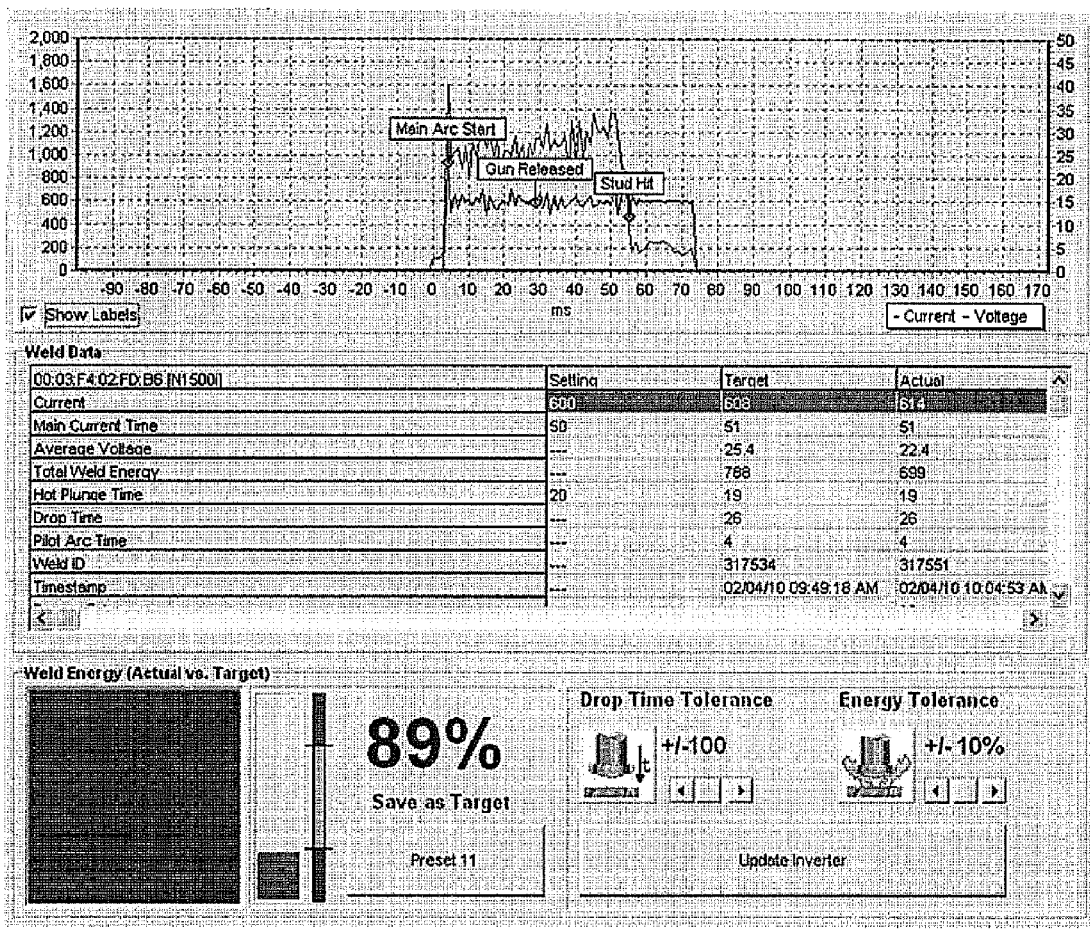
FIG. 14 is a graph of the arc current and arc voltage as a function of time differing from the reference of FIG. 9 and including a decreased lift with a constant energy input control not included.
Figure 15:
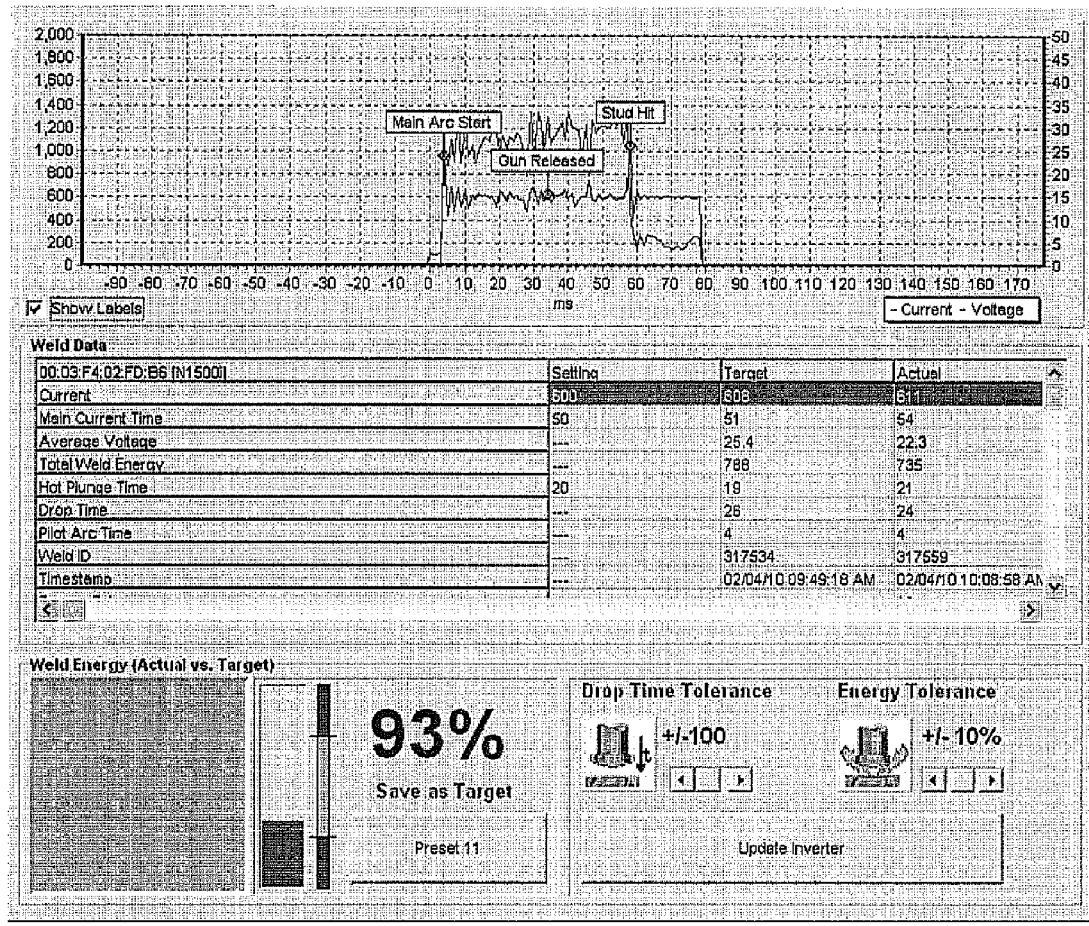
FIG. 15 is a graph of the arc current and arc voltage as a function of time differing from the reference of FIG. 9 including a decreased lift and including a constant energy input control.
Figure 16:
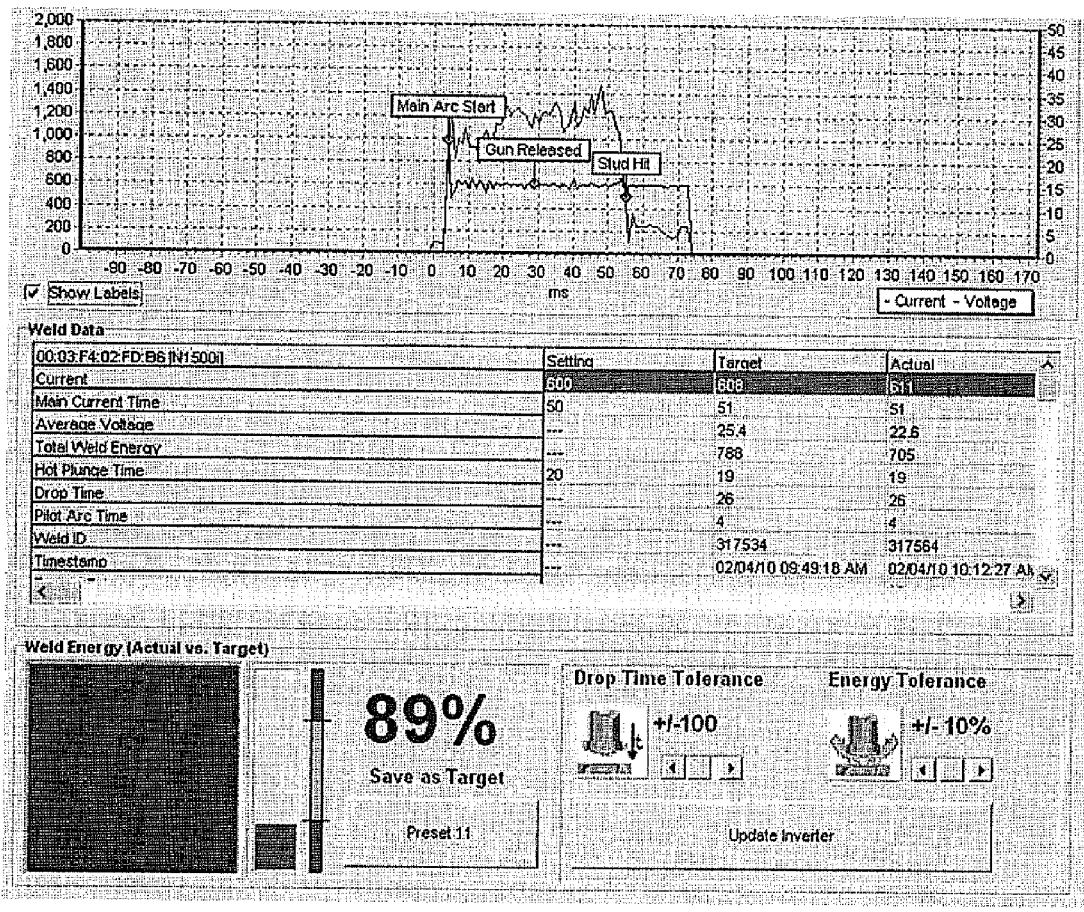
FIG. 16 is a graph of the arc current and arc voltage as a function of time differing from the reference of FIG. 9 and including a galvanized base material without a constant energy input control.
Figure 17:
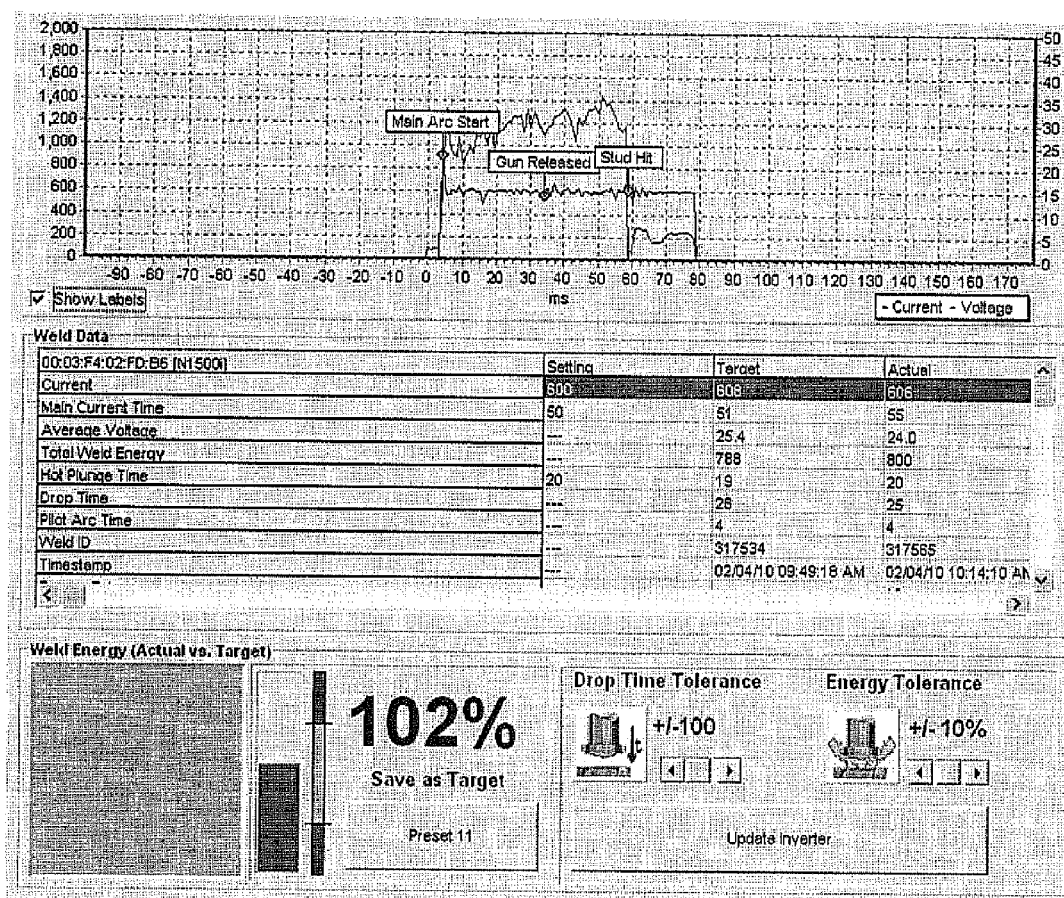
FIG. 17 is a graph of the arc current and arc voltage as a function of time differing from the reference of FIG. 9 and including a galvanized base material with a constant energy input control.
Figure 18:
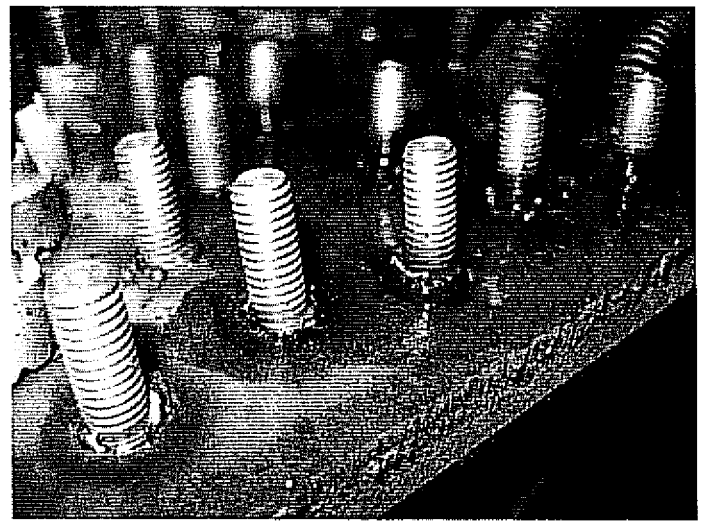
FIG. 18 is a graphical depiction of a short cycle weld including studs attached to a mild steel base material.
Figure 19:
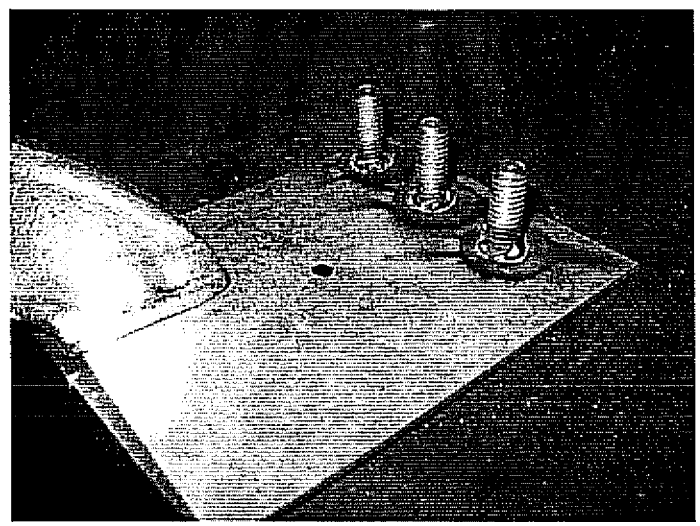
FIG. 19 is a graphical view of a short cycle weld including studs attached to a galvanized base material.
Figure 20:
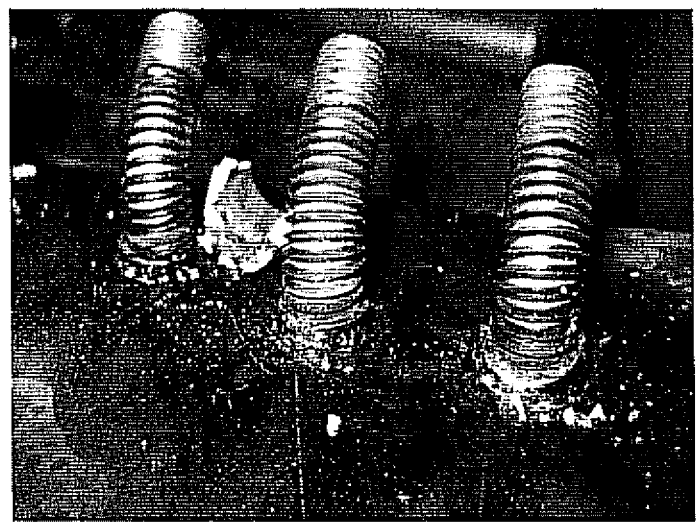
FIG. 20 is a graphical depiction of a drawn arc weld after bend test including a mild steel base and cutting oil applied to the base material.

Referring to the various figures, there is shown a drawn arc welding process that includes the steps of providing a work piece, providing a welding tool holding a metal object onto the work piece, providing a power supply outputting a preset current, providing an arc voltage sensing device, lifting the metal object and drawing a pilot arc, energizing a welding current locally melting the metal object and forming a weld pool in the work piece, measuring an arc voltage at early stages of welding time, accumulating an arc energy, predicting the arc voltage for a remaining time of the welding process, regulating the time of later stages of the welding time wherein the accumulated arc energy and predicted arc voltage are utilized to achieve a desired energy input set point, and then plunging the metal object into the locally melted work piece forming a weld between the metal object and the work piece. In one aspect, the accumulating energy may include a pilot arc energy and an energy applied in a cleaning step of the pilot arc, as well as the main arc welding current.

In one aspect, various metal objects may be attached to a work piece. Metal objects may include a fastener, a metal stud, a metal nut, a metal shaft, and a metal bracket. It should be realized that various metal objects may include different shapes and configurations that may be welded to a work piece.

The step of measuring an arc voltage may include multiple measurement phases. In one aspect, a first phase may include an initial melting of a surface of the work piece wherein the measured arc voltage is not utilized in the predicting step because the voltage is not stable. In another aspect, the step of measuring an arc voltage may include additional phases wherein the arc voltage is measured and stored for use in the predicting step. The step of measuring an arc voltage may include measuring the voltage at output terminals of the welder and subtracting a cable and connector voltage drop that is estimated from a previous weld during stud plunge or from a cable drop measurement or calibration procedure. The cable and connector voltage drop may be estimated following a plunge of the previous weld wherein a short circuit is created between the stud the weld pool and the current is maintained and a resistance is calculated from a measured voltage and measured current. The resistance may be multiplied by the current of the welding process to estimate the cable and connector voltage drop.

In one aspect, the step of predicting an arc voltage for a remaining time of the welding process may include calculating an average arc voltage of the additional measurement phases and then linearly extrapolating the data to determine a predicted future arc voltage. In one aspect, the measured and stored arc voltages of the additional phases may be subjected to a second order or higher order polynomial regression to determine the predicted future arc voltage. In one aspect, the step of calculating the time of the remaining welding process includes utilizing a varying arc energy having a main arc current and a different plunge arc current.

In one aspect, a desired energy input is applied as a set point for the welding process. The desired energy input may be determined based on varying characteristics of the welding process as well as the materials utilized in the welding process. For example, the desired energy input may be determined in relation to the metal object being welded, the position of the welding operation, conditions of the welding operation, as well as the type and thickness of work piece being utilized and the work piece back-side heat mark requirement. Various process parameters including welding operations having differences in lift and plunge heights as well as the conditions of both the work piece and metal objects will be discussed in more detail below.

The drawn arc welding process may include a duration greater than 100 milliseconds and may include a ferrule positioned about the metal object. Additionally, the process may be a short cycle process less than 100 milliseconds wherein a gas shielding may or may not be used to protect oxidation of a weld zone.

Various power supplies may be utilized in the process. Power supplies may include an inverter controlled by a microprocessor having either pulse width modulation or phase shift control, a silicon controlled rectifier current regulated power source, and a buck converter based power source fed by a direct current voltage source.

Referring to FIG. 1, there is shown a graphical depiction of one embodiment of a welding process that includes multiple measurement phases. As can be seen in the figure, the total welding arc time may be divided into sequential phases or time segments. The first phase is a settling phase wherein a surface coating is burnt off of a work piece and the arc voltage may become unstable or change dramatically. In this phase, the arc voltage is monitored but the reading is not stored for use during the predicting step. In a second phase the arc voltage is recorded and analyzed for the purpose of forecasting for a remaining time of the welding process. In this phase, various forecast or predicting methods may be utilized including linear extrapolation as well as higher order polynomial regressions. As can be seen in the figure, this phase may be subdivided into two time segments labeled as quadrant two and quadrant three. An average reading of the arc voltage of the first time segment and the second time segment may be utilized to extrapolate and predict a future voltage trend for the remaining time of the process.

The last phase of FIG. 1 includes an adjustment phase that is based on the forecast or predicted voltage trend in the predicting step. In the last phase a calculation is performed to determine the time needed such that a total energy of phase one and phase two which were measured and a forecasted energy of phase three will add up to a desired energy set point.

Assume $V_2$ and $V_3$ are mean voltage of quadrant 2 and 3, and $E_1$, $E_1$ and $E_3$ are mean energy of quadrant 1, 2 and 3 respectively. $E_{sp}$ is the desired energy set point. The needed $4^{th}$ quadrant energy to satisfy $E_{sp}$ is $E_4 = E_{sp} - E_0 - E_1 - E_2 - E_3$ where $E_1$, $E_2$ and $E_3$ are actual energy of the first, second and third quadrant measured and accumulated, and $E_0$ is the accumulated pilot arc energy.

The predicted $4^{th}$ quadrant voltage is:

$$V_4 = \frac{V2 + V3}{2}$$

with mean prediction method;

$V_4 = 2V_3 - V_2$ with linear extrapolation method.

Thus the time needed in the $4^{th}$ quadrant is $$t_4 = \frac{E4}{I \times V4}$$

where I is the average preset current for the remaining weld ($4^{th}$ quadrant).

It should be realized that various numbers of phases or forecasting methods may be utilized.

The process of the present invention may be implemented utilizing an energy set point that is saved as a preset in a welding power supply. Generally, known power supplies may include a current set point and time set point. The use of an energy set point in conjunction with the outlined processes of the present invention allows additional control over a welding operation not present in prior art processes. The presets may be associated with a particular fastener in a particular welding position or condition. Additionally, when a preset is recalled by the welding controller, a programmed current, time (as a starting point before the adjustment), and energy set point will also be recalled together to achieve a constant energy input for a particular fastener welding application. In one aspect, the preset may include a current having a constant level or a pulsed waveform.

EXAMPLES

The following examples are embodied in FIGS. 2-20 and detail changes in welding conditions including a welding gun set up as well as differing properties of the welding materials. The examples include both a constant energy input and without a constant energy input detailing the differences a constant energy input makes while changing typical weld conditions.

The examples embodied in FIGS. 2-8 include the use of a Nelweld N1500i power supply. A Nelson NS-40 medium duty hand gun with a short cycle core and without a plunge dampener was utilized. Various studs and ferrules were utilized in the various examples with a drawn arc stud of ⅜ of an inch and included the use of a drawn arc ferrule. The short cycle examples detailed in FIGS. 9-17 include the use of a short cycle stud. A welding cable including a number 1 AWG 25-foot cable was utilized to link the welding gun to the power supply. The welding gun included a stud negative polarity.

The experimental procedure included performing a weld that is then set as a target. Following, a reference weld is performed showing a consistency to the set point. Following the reference weld, various weld conditions were changed to demonstrate a change in voltage which would normally change the overall energy input in a welding operation. Then a constant energy function according to the process is enabled and adjustments are adaptively made to overcome the voltage changes and deliver a similar amount of energy as the target weld.

FIGS. 2-8 detail experimental results of a welding process including a ⅜ inch stud in which various processing parameters are adjusted with both a constant energy input and without a constant energy input. The results detailed in FIGS. 2-8 are shown in Table 1 which details the arc current, arc voltage, arc time, energy, gun lift, and percent energy of the target.

TABLE 1

| Weld ID | Conditions | Constant Energy Function | Current (A) | Voltage (V) | Arc Time (ms) | Energy (J) | Gun Lift (mm) | Energy % of Target |
|---|---|---|---|---|---|---|---|---|
| | Target weld (Drawn Arc) | OFF | 550 | 28.6 | 323 | 5075 | 2.0 | — |
| A | Reference weld (Drawn Arc) Same as target settings | OFF | 551 | 28.3 | 322 | 5017 | 2.0 | 99 |
| B | Increase lift (Drawn Arc) | OFF | 551 | 32.8 | 319 | 5772 | 2.7 | 114 |
| C | Increase lift (Drawn Arc) | ON | 549 | 32.8 | 277 | 4986 | 2.7 | 98 |
| D | Decrease lift (Drawn Arc) | OFF | 554 | 25.7 | 321 | 4577 | 1.0 | 90 |
| E | Decrease lift (Drawn Arc) | ON | 551 | 25.8 | 355 | 5054 | 1.0 | 100 |
| F | Cutting oil applied to surface (Drawn Arc) | OFF | 551 | 33.2 | 329 | 6065 | 2.0 | 119 |
| G | Cutting oil applied to surface (Drawn Arc) | ON | 550 | 32.4 | 288 | 5132 | 2.0 | 101 |
| | Target weld (Short Cycle) | OFF | 608 | 25.4 | 51 | 788 | 1.0 | — |
| H | Reference weld (Short Cycle) Same as target settings | OFF | 602 | 25.5 | 50 | 768 | 1.0 | 97 |
| I | Cutting oil applied to surface (Short Cycle) | OFF | 613 | 31.9 | 51 | 996 | 1.0 | 126 |
| J | Cutting oil applied to surface (Short Cycle) | ON | 606 | 31.7 | 46 | 882 | 1.0 | 112 |
| K | Increase lift (Short Cycle) | OFF | 607 | 32.5 | 50 | 985 | 2.0 | 125 |

TABLE 1-continued

| Weld ID | Conditions | Constant Energy Function | Current (A) | Voltage (V) | Arc Time (ms) | Energy (J) | Gun Lift (mm) | Energy % of Target |
|---|---|---|---|---|---|---|---|---|
| L | Increase lift (Short Cycle) | ON | 606 | 31.0 | 41 | 769 | 2.0 | 97 |
| M | Decrease lift (Short Cycle) | OFF | 614 | 22.4 | 51 | 699 | 0.5 | 89 |
| N | Decrease lift (Short Cycle) | ON | 611 | 22.3 | 54 | 735 | 0.5 | 93 |
| O | Galvanized C-90 (Short Cycle) | OFF | 611 | 22.6 | 51 | 705 | 1.0 | 89 |
| P | Galvanized C-90 (Short Cycle) | ON | 606 | 24.0 | 55 | 800 | 1.0 | 102 |

FIGS. 9-17 detail experimental results of a welding process including a 3/8 inch stud in which various processing parameters are adjusted with both a constant energy input and without a constant energy input. The results detailed in FIGS. 9-17 are shown in Table 1 which details the arc current, arc voltage, arc time, energy, gun lift, and percent energy of the target for a short cycle weld.

As can be seen by the results detailed in table 1, the constant energy input as embodied in the process significantly reduces the difference in weld energy applied to the welding process when various conditions are changed. For example, when the lift of the gun is increased the difference in weld energy applied to the weld without the use of the process including the constant energy input realizes a difference of 14% in energy applied to the weld. This is in comparison to the difference of 2% of a difference in weld energy applied to the welding process when the constant energy input as embodied in the process is utilized. A resulting error of 12% is removed as a result of the process including the constant energy input. Various summaries of the percent removed as well as the corrected differences in energy applied to the welds are detailed in Table 2.

TABLE 2

| Process | Change in conditions | Difference in weld energy (C.E off) | Corrected difference in weld energy (C.E. on) | Error Removed |
|---|---|---|---|---|
| Drawn Arc | Increased Gun Lift | +14% | −2% | 12% |
| Drawn Arc | Decreased Gun Lift | −10% | +0% | 10% |
| Drawn Arc | Cutting oil contaminants | +19% | +1% | 18% |
| Short Cycle | Increased Gun Lift | +25% | −3% | 22% |
| Short Cycle | Decreased Gun Lift | −11% | −7% | 4% |
| Short Cycle | Cutting oil contaminants | +26% | +12% | 14% |
| Short Cycle | Galvanized base material | −11% | +2% | 9% |

As can be seen in table 2, the process utilizing a constant energy input reduces the overall errors of various changes in process conditions for both a drawn arc and short cycle process as detailed in the various figures.

While the figures and tables in the example section provide different scenarios in which the constant energy input as embodied in the process improves the overall energy input for various changes in processing parameters, differing processing parameters may also be corrected by the process as embodied in the invention. For example, various other contaminants as well as intentionally applied layers applied to a surface of a work piece and may be accounted for by utilizing a process having a controlled desired energy input set point.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A drawn arc welding process comprising the steps of:
providing a work piece;
providing a welding tool holding a metal object onto the work piece;
providing a power supply outputting a preset current;
providing an arc voltage sensing device;
lifting the metal object and drawing a pilot arc current;
energizing a welding current locally melting the metal object and forming a weld pool in the work piece;
measuring an arc voltage;
accumulating an arc energy;
predicting the arc voltage for a remaining time of the welding process;
calculating the time of the remaining welding process so that the sum of the accumulated arc energy and remaining arc energy equal to a desired energy set point;
plunging the metal object into the locally melted work piece forming a weld between the metal object and the work piece to achieve the calculated time of the remaining weld.

2. The drawn arc welding process of claim 1 wherein the timing of plunging the metal object is based on a prior knowledge of the metal object plunge time obtained from calibration welds.

3. The drawn arc welding process of claim 1 wherein the metal object is selected from: a fastener, a metal stud, a metal nut, a metal shaft and a metal bracket.

4. The drawn arc welding process of claim 3 wherein the metal object includes an aluminum flux ball.

5. The drawn arc welding process of claim 1 wherein the step of measuring an arc voltage includes multiple measurement phases.

6. The drawn arc welding process of claim 5 wherein a first phase includes an initial melting of a surface or surface coating of the work piece wherein the measured arc voltage is not stored and utilized in the predicting step.

7. The drawn arc welding process of claim 5 including additional phases wherein the arc voltage is measured and stored.

8. The drawn arc welding process of claim 7 wherein an average arc voltage of the additional phases is calculated and linearly extrapolated to determine the predicted arc voltage.

9. The drawn arc welding process of claim 7 wherein the measured and stored arc voltages of the additional phases are subjected to second order or higher order polynomial regression to determine the predicted arc voltage.

10. The drawn arc welding process of claim 1 wherein the step of measuring an arc voltage includes measuring the voltage at the output terminals of the welder and subtracting the product of arc current and cable resistance measured in previous welds after stud plunges and is short-circuited into weld pool but before the current is shut-off.

11. The drawn arc welding process of claim 1 wherein a desired energy input is applied as a set point for the welding process.

12. The drawn arc welding process of claim 1 wherein the desired energy input is determined for in relation to the metal object, the position of the welding operation, the conditions of the welding operation and the type and thickness of work piece and work piece back-side marking requirement.

13. The drawn arc welding process of claim 1 wherein the process has duration greater than 100 milliseconds and includes a ferrule positioned about the metal object.

14. The drawn arc welding process of claim 1 wherein the process is a short cycle process wherein gas shielding may or may not be used to protect oxidization of a weld zone.

15. The drawn arc welding process of claim 1 wherein the power supply is selected from: an inverter controlled by a microprocessor having either pulse width modulation or phase shift control, a silicon controlled rectifier current regulated power source, and a buck converter based power source fed by a direct current voltage source.

16. The drawn arc welding process of claim 1 wherein the preset current includes a constant level.

17. The drawn arc welding process of claim 1 wherein the preset current includes a pulsed waveform.

18. The drawn arc welding process of claim 1 wherein the accumulating energy includes a pilot arc energy and an energy applied in a cleaning step of the pilot arc.

19. The drawn arc welding process of claim 1 wherein the step of calculating the time of the remaining welding process includes utilizing a varying arc energy having a main arc current and a different plunge arc current.

20. A drawn arc welding process comprising the steps of:
providing a work piece;
providing a welding tool holding a metal object onto the work piece;
providing a power supply outputting a preset current;
providing an arc voltage sensing device;
lifting the metal object and drawing a pilot arc current;
energizing a welding current locally melting the metal object and forming a weld pool in the work piece;
measuring an arc in multiple measurement phases including a first phase having an initial melting of a surface or surface coating of the work piece wherein the measured arc voltage is not stored and additional phases wherein the arc voltage is measured and stored;
predicting the arc voltage for a remaining time of the welding process;
regulating the time of the welding process wherein the measured arc voltage and predicted arc voltage are utilized to control a desired energy input set point;
plunging the metal object into the locally melted work piece forming a weld between the metal object and the work piece.

21. A drawn arc welding process comprising the steps of:
providing a work piece;
providing a welding tool holding a metal object onto the work piece;
providing a power supply outputting a preset current;
providing an arc voltage sensing device;
lifting the metal object and drawing a pilot arc current;
energizing a welding current locally melting the metal object and forming a weld pool in the work piece;
measuring an arc in multiple measurement phases including a first phase having an initial melting of a surface or surface coating of the work piece wherein the measured arc voltage is not stored and additional phases wherein the arc voltage is measured and stored and wherein the measuring step includes measuring the voltage at output terminals of the welder and subtracting a cable and connector voltage drop estimated from a previous weld during plunge;
predicting the arc voltage for a remaining time of the welding process;
regulating the time of the welding process wherein the measured arc voltage and predicted arc voltage are utilized to control a desired energy input set point;
plunging the metal object into the locally melted work piece forming a weld between the metal object and the work piece.

* * * * *